United States Patent
Wang et al.

(10) Patent No.: US 12,430,404 B2
(45) Date of Patent: Sep. 30, 2025

(54) METHOD AND APPARATUS FOR PROCESSING SYNTHETIC FEATURES, MODEL TRAINING METHOD, AND ELECTRONIC DEVICE

(71) Applicant: BEIJING BAIDU NETCOM SCIENCE TECHNOLOGY CO., LTD., Beijing (CN)

(72) Inventors: Kafeng Wang, Beijing (CN); Chengzhong Xu, Beijing (CN); Haoyi Xiong, Beijing (CN); Xingjian Li, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 590 days.

(21) Appl. No.: 17/988,168

(22) Filed: Nov. 16, 2022

(65) Prior Publication Data
US 2023/0072240 A1    Mar. 9, 2023

(30) Foreign Application Priority Data
Nov. 18, 2021    (CN) .......................... 202111372268.4

(51) Int. Cl.
G06F 18/21     (2023.01)
G06F 18/213    (2023.01)
G06F 18/2415   (2023.01)

(52) U.S. Cl.
CPC ........ *G06F 18/2193* (2023.01); *G06F 18/213* (2023.01); *G06F 18/2415* (2023.01)

(58) Field of Classification Search
CPC . G06F 18/2193; G06F 18/2415; G06F 18/213
See application file for complete search history.

(56) References Cited

U.S. PATENT DOCUMENTS 11,210,673 B2 * 12/2021 Li ........................... G06N 3/088
11,593,641 B2 *  2/2023 Chakraborty .......... G06N 3/084
(Continued)

OTHER PUBLICATIONS

Cruz, Rafael M.O., et al., "META-DES. Oracle: Meta-learning and feature selection for dynamic ensemble selection"; Nov. 1, 2018; arXiv:1811.00217vi; 48 pages.
(Continued)

*Primary Examiner* — David E Choi
(74) *Attorney, Agent, or Firm* — Lippes Mathias LLP

(57) ABSTRACT

A method for processing synthetic features is provided, and includes: the synthetic features to be evaluated and original features corresponding to the synthetic features are obtained. A feature extraction is performed on the synthetic features to be evaluated based on a number S of pre-trained samples, to obtain meta features with S samples. S is a positive integer. The meta features are input into the pre-trained meta feature evaluation model for a binary classification prediction, to obtain a probability of binary classification. Quality screening is performed on the synthetic features to be evaluated according to the probability of the binary classification, to obtain second synthetic features to be evaluated. The second synthetic features are classified in a good category. The second synthetic features and original features are input into a first classifier for evaluation. classified in a poor category.

13 Claims, 6 Drawing Sheets

(56) References Cited

U.S. PATENT DOCUMENTS

| | | | |
|---|---|---|---|
| 11,615,265 B2* | 3/2023 | Karnagel | G06F 18/2148 |
| | | | 706/12 |
| 11,868,230 B2* | 1/2024 | Sathe | G06F 11/3428 |
| 12,346,776 B2* | 7/2025 | Margolin | G06F 21/6245 |
| 2017/0337486 A1* | 11/2017 | Zang | G06F 16/2455 |
| 2019/0286242 A1 | 9/2019 | Ionescu et al. | |
| 2020/0311611 A1* | 10/2020 | Kennedy | G06N 20/20 |
| 2022/0300758 A1* | 9/2022 | Lange | G06F 18/22 |
| 2023/0072240 A1* | 3/2023 | Wang | G06F 18/2415 |
| 2024/0144656 A1* | 5/2024 | Bai | G06V 10/772 |
| 2024/0320428 A1* | 9/2024 | Zhang | G06V 30/19127 |
| 2025/0118058 A1* | 4/2025 | Steimer | G06V 10/776 |

OTHER PUBLICATIONS

International Search Report for EP22208151.5, Mailed Mar. 9, 2023, 13 pages.

* cited by examiner

METHOD AND APPARATUS FOR PROCESSING SYNTHETIC FEATURES, MODEL TRAINING METHOD, AND ELECTRONIC DEVICE

CROSS-REFERENCE TO RELATED APPLICATION

The present application is based upon and claims priority to Chinese Patent Application No. 202111372268.4, filed on Nov. 18, 2021, the entirety contents of which are incorporated herein by reference for all purposes.

TECHNICAL FIELD

The present disclosure relates to a field of data processing, specifically to a field of artificial intelligence such as deep learning and the field of big data, and particularly to a method and an apparatus for processing synthetic features, a method for training a meta feature evaluation model, an electronic device and a storage medium.

BACKGROUND

Feature engineering is widely applied in table data set modeling, and the feature engineering performs combination operation by utilizing existing original features to generate synthetic features. This feature combination is exponentially increased along with the number of original features and the number of operators, and a large number of the synthetic features are generated. In general, the original features are combined and operated relatively quickly, but a large amount of time needs to be consumed for feature evaluation of a large number of synthetic features, so that main calculation time is consumed on evaluating the quality of a large number of new features.

SUMMARY

A method and an apparatus for processing synthetic features, a method for training a meta feature evaluation model, and a storage medium are provided in the present disclosure.

A method for processing synthetic features is provided. The method includes: obtaining the synthetic features to be evaluated and original features corresponding to the synthetic features; performing a feature extraction on the synthetic features to be evaluated based on a number S of pre-trained samples, to obtain meta features with S samples, in which S is a positive integer; inputting the meta features into a pre-trained meta feature evaluation model for a binary classification prediction, to obtain a probability of binary classification; performing quality screening on the synthetic features to be evaluated according to the probability of the binary classification, to obtain second synthetic features to be evaluated, in which the second synthetic features are classified in a good category; and inputting the second synthetic features and the original features into a first classifier for evaluation.

A method for training a meta feature evaluation model is provide, which is applied to implement a synthetic feature evaluation, and includes: obtaining k synthetic features of each of n data sets, in which n and k are both positive integers; performing a feature extraction on the k synthetic features of each of the n data sets, to obtain a meta feature set, in which, the meta feature set comprises n*k meta features, a number of samples in the meta feature set is s, and s is a positive integer smaller than or equal to a minimum number of samples in the n data sets; obtaining m original features of each of the n data sets, in which m is a positive integer; obtaining a classification label of each of the n*k meta features based on the k synthetic features of each of the n data sets and the m original features of each of the n data sets; and training a second classifier based on the meta feature set and the classification label of each of the n*k meta features, obtaining model parameters and a numerical value of s, determining the numerical value of s as a number S of pre-trained samples, and generating the meta feature evaluation model according to the model parameters.

An apparatus for processing synthetic features is provided. The apparatus includes: an acquiring module, configured to obtain the synthetic features to be evaluated and original features corresponding to the synthetic features; an extraction module, configured to perform a feature extraction on the synthetic features to be evaluated based on a number S of pre-trained samples, to obtain meta features with S samples, in which S is a positive integer; a predicting module, configured to input the meta features into a pre-trained meta feature evaluation model for a binary classification prediction, to obtain a probability of binary classification; a screening module, configured to perform quality screening on the synthetic features to be evaluated according to the probability of the binary classification, to obtain second synthetic features to be evaluated, in which the second synthetic features are classified in a good category; and an evaluation module, configured to input the second synthetic features and the original features into a first classifier for evaluation.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The illustrative embodiments of the present disclosure are described as below with reference to the accompanying drawings, which include various details of embodiments of the present disclosure to facilitate understanding, and should be considered as merely illustrative. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

In the related technology, a large number of new features are generated by using a feature engineering, and all the generated synthetic features are put into a classifier for evaluation, so a large amount of time is wasted for evaluating synthetic features classified in a poor category.

Therefore, a method and an apparatus for processing synthetic feature, a method and an apparatus for training a meta feature evaluation model, an electronic device and a storage medium are provided in the present disclosure. Before the classifier evaluates the synthetic features, the synthetic features are screened, and a part of the synthetic features classified in the poor category are directly screened out. Screened synthetic features classified in the good category are evaluated, and a synthetic feature evaluation efficiency is improved. Specifically, a method and an apparatus for processing synthetic features, a method and an apparatus for training a meta feature evaluation model, an electronic device, and a storage medium are described below with reference to the accompanying drawings in the embodiments of the present disclosure.

It should be noted that features in the present disclosure are not limited to numerical features, and may also be non-numerical features. For non-numerical features, the non-numerical features may be transformed into numerical features by means of an equivalent mapping, and then may be processed, which is not limited herein.

Figure 1:
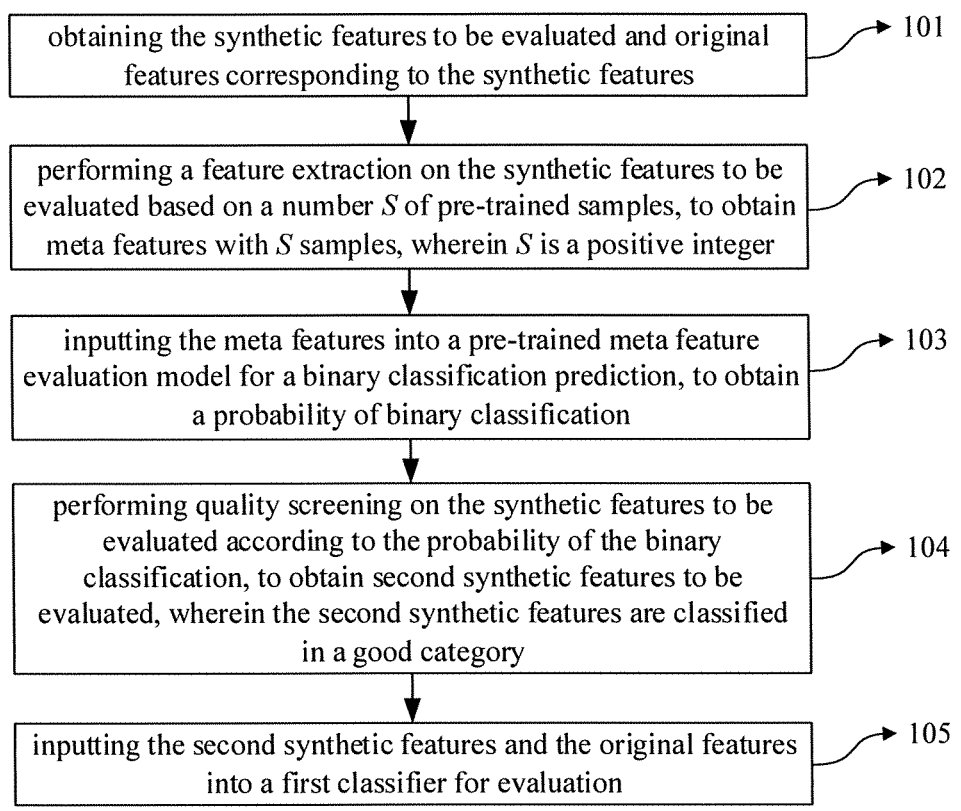
FIG. 1 is a schematic flowchart illustrating a method for processing synthetic features in an embodiment of the present disclosure.

FIG. 1 is a schematic flowchart illustrating a method for processing synthetic features in an embodiment of the present disclosure. It should be noted that, the method for processing synthetic features in the embodiment of the present disclosure may be applied to an apparatus for processing synthetic features, and the apparatus for processing synthetic features may be configured in an electronic device.

As illustrated in FIG. 1, the method for processing synthetic features may include the following blocks.

At block 101, the synthetic features to be evaluated and original features corresponding to the synthetic features are obtained.

In the embodiment of the present disclosure, the synthetic features to be evaluated may be the synthetic features generated in the feature engineering.

It should be noted that data and features determine the upper limit of machine learning, but model and algorithm are only approximating the upper limit. Therefore, the feature engineering holds a quite important position in machine learning. In practical application, the feature engineering is a key to a success of the machine learning.

It can be understood that the feature engineering is a process that utilizes relevant knowledge in the data field to create features that may enable the machine learning algorithm to achieve an optimal performance. The feature engineering also includes data preprocessing, feature extraction, feature selection, feature construction and etc. A feature construction method is mainly discussed in the method of the present disclosure. The feature construction is also called feature synthesis, in which a numerical symbol operation is performed on existing features to obtain new features. For example, one numerical value type feature vector is subjected to unary operations such as modules, log, root square and the like. And two numerical value type feature vectors are subjected to binary operations such as addition, subtraction, multiplication, division and the like.

At block 102, a feature extraction is performed on the synthetic features to be evaluated based on a number S of pre-trained samples, to obtain meta features with S samples. S is a positive integer.

Optionally, the feature extraction is performed on the synthetic features to be evaluated by adopting a minhash algorithm based on the number S of the pre-trained samples, to obtain the meta features with S samples across different data sets. The meta features may describe the feature similarity of different data sets.

It should be noted that the minimum hash algorithm is one of locality-sensitive hashing (LSH) algorithms. The locality-sensitive hashing is a fast nearest neighbor search algorithm suitable for large scale high-dimensional data, which is essentially based on an assumption, the probability that two data with a very high similarity are mapped into a same hash value is large, and the two data with a very low similarity are difficult to be mapped into a same hash value. According to the principle, it is assumed that there are set A and set B, and after elements in set A and set B are hashed by a hash function, if the elements with the minimum hash value in set A and set B are in both A∪B and A∩B, then hmin(A)=hmin(B). The similarity of set A and set B may be expressed as the probability that the smallest hash values of set A and set B are equal, that is:

$$J(A,B)=Pr[h\min(A)=h\min(B)].$$

At block 103, the meta features are input into a pre-trained meta feature evaluation model for a binary classification prediction, to obtain a probability of binary classification.

It should be noted that the number S of the pre-trained samples in block 102 and a meta feature evaluation model in block 103 are obtained by pre-training. In some embodiments of the present disclosure, the synthetic features corresponding to each data set may be obtained based on the original features in the data set. And the feature extraction is performed on the synthetic features by adopting a minimum hash algorithm to obtain a meta feature set. The original features and the synthetic features are trained and tested to obtain the classification label of each of the meta features. A second classifier is trained according to the meta feature set and the classification labels of the meta features in the meta feature set to obtain model parameters and a numerical value of s. The numerical value of s is determined as the number S of the pre-trained samples. The meta feature evaluation model is generated according to the model parameters.

It should also be noted that the second classifier may be random forest or similar bagging (bagging method), boosting (boosting method), etc., which is not limited herein.

At block 104, quality screening is performed on the synthetic features to be evaluated according to the probability of the binary classification, to obtain second synthetic features to be evaluated. The second synthetic features are classified in a good category.

That is, the meta features are input into the pre-trained meta feature evaluation model, to obtain the probability of the binary classification. The quality screening is performed on the synthetic features to be evaluated according to the probability of the binary classification, to obtain the second synthetic features to be evaluated, i.e., the synthetic features classified in a good category.

At block 105, the second synthetic features and the original features are input into a first classifier for evaluation. The evaluation includes training, verifying and testing evaluation.

It should be noted that the first classifier may be random forest or similar bagging (bagging method), boosting (boosting method), etc., which is not limited herein.

That is, the synthetic features classified in the good category and the original features may be input into the first classifier, so that the first classifier performs an evaluation on the synthetic features classified in a good category and the original features, and the purpose of quickly evaluating the quality of the synthetic features may be achieved.

According to the method for processing synthetic features in an embodiment of the present disclosure, the feature extraction is performed on the synthetic features to be evaluated based on the number S of the pre-trained samples, to obtain the meta features with S samples. The meta features are input into the pre-trained meta feature evaluation model for the binary classification prediction, to obtain the probability of the binary classification. The synthetic features to be evaluated are screened according to the probability of the binary classification, to obtain the second synthetic features classified in the good category. The second synthetic features classified in the good category and the original features are input into the first classifier for evaluation, so that the first classifier may quickly evaluate the synthetic features, the time for evaluating the synthetic features classified in a poor category is reduced, and an accuracy ratio of the first classifier may be improved.

Figure 2:
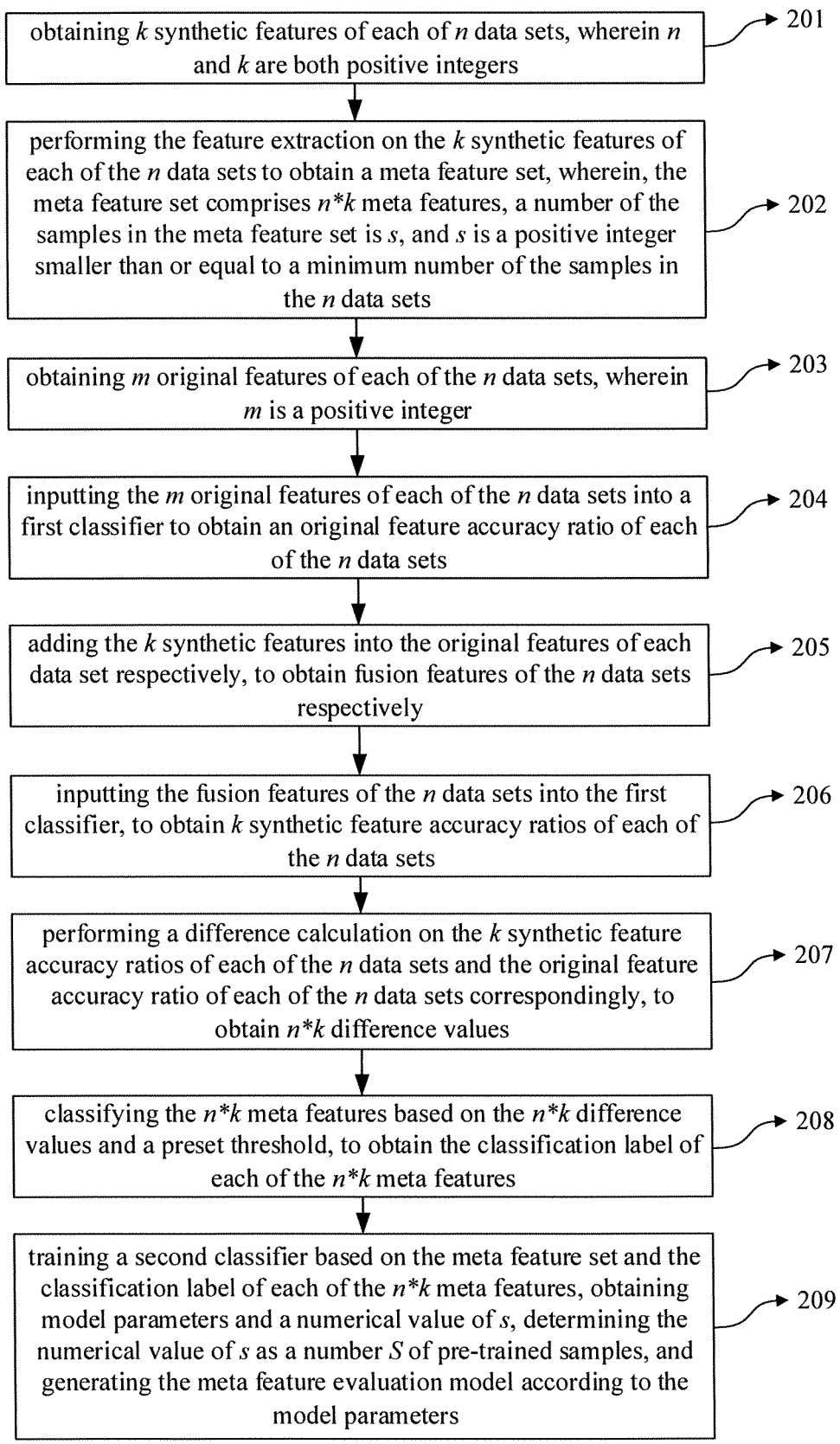
FIG. 2 is a schematic diagram of an implementation process of obtaining a meta feature evaluation model and a number S of samples by pre-training in an embodiment of the present disclosure.

It should be noted that in the process of obtaining the meta feature evaluation model and the number S of the samples by pre-training, the classification label corresponding to each meta feature may be obtained by comparing the original feature accuracy ratio with the synthetic feature accuracy ratio, and then the model is trained according to the meta features and their classification labels. As an example, as illustrated in FIG. 2, in a method for processing synthetic features in an embodiment of the present disclosure, an implementation process of obtaining a meta feature evaluation model and a number S of samples by pre-training may include the following blocks.

At block 201, k synthetic features of each of n data sets are obtained. n and k are both positive integers.

As an example, n data sets $[s^i, m^i]$, $i \in [1, n]$ for training are provided, and each data set includes $m^i$ original features and $s^i$ samples. i is a serial number of the data set. That is, different data sets may contain different numbers of original features and different numbers of samples. Each data set generates k synthetic features $f_j^i$, $j \in [1, k]$, $i \in [1, n]$ (for example, n=2, k=3, that is, there are two data sets $[s^i, m^i]$, $i \in [1,2]$ for training, each data set generates three synthetic features, the data set with a serial number of 1 will generate three synthetic features $f_1^1$, $f_2^1$ and $f_3^1$, and the data set with a serial number of 2 will generate three synthetic features $f_1^2$, $f_2^2$ and $f_3^2$), so that the n data sets generate n*k synthetic features. In some embodiments of the present disclosure, synthetic feature $f_j^i$, that is, $f_j^i = Syn(m^i)$, $j \in [1, k]$, $i \in [1, n]$, may be generated by using an original feature $m^i$ according to a feature synthesis algorithm Syn. n and k are both positive integers.

At block 202, a feature extraction is performed on the k synthetic features of each of the n data sets to obtain a meta feature set. The meta feature set includes n*k meta features. A number of samples in the meta feature set is s, and s is a positive integer smaller than or equal to a minimum number of the samples in the n data sets.

Optionally, in some embodiments of the present disclosure, the feature extraction is performed on the synthetic features $f_j^i$ by adopting a minhash algorithm, to obtain meta features meta with S samples across different data sets. That is $$meta_j^i = minhash(f_j^i), j \in [1, k], i \in [1, n].$$

Therefore, meta feature set [s, n*k] is obtained, the number of samples of the meta features is s, and the number of the meta features is n*k. It should be noted that the number s of samples is a positive integer smaller than or equal to the minimum number of samples in then data sets, that is, $s \leq min(s^i)$, $i \in [1, n]$. For example, let n=3, the number $s^1$ of the samples of the data set with a serial number of 1 is 10, the number $s^2$ of the samples of the data set with a serial number of 2 is 20, the number $s^3$ of the samples of the data set with a serial number of 3 is 30, and the minimum positive integer in the number of the samples in the three data sets is $s^1$. The feature extraction is performed on the synthetic features of three data sets, and meta features meta with s samples are obtained. s is a positive integer less than or equal to 10;

At block 203, m original features of each of the n data sets are obtained. m is a positive integer.

That is, $m^i$ ($i \in [1, n]$) original features of each of the n data sets $[s^i, m^i]$, $i \in [1, n]$ are obtained, in which i is a serial number of the data set.

At block 204, the m original features of each of the n data sets are input into a first classifier, to obtain an original feature accuracy ratio of each of the n data sets.

As an example, in some embodiments of the present disclosure, $m^i$ ($i \in [1, n]$) original features of each of the n data sets are input into a first classifier $C_1$, to obtain original feature accuracy ratio $acc_0^i$ ($i \in [1, n]$) of each of the n data sets, that is $acc_0^i = C_1([s^i, m^i])$, $i \in [1, n]$.

At block 205, the k synthetic features are added into the original features of each data set respectively, to obtain fusion features of the n data sets respectively.

At block 206, the fusion features of the n data sets are input into the first classifier, to obtain k synthetic feature accuracy ratios of each of the n data sets.

As an example, in some embodiments of the present disclosure, the fusion features of the n data sets are input into the first classifier $C_1$, to obtain k synthetic feature accuracy ratios $acc_j^i$ ($i \in [1, n]$, $j \in [1, k]$) of each of the n data sets, that is $acc_j^i = C_1([s^i, m^i] \cup f_j^i)$, $j \in [1, k]$, $i \in [1, n]$.

At block 207, a difference calculation is performed on the k synthetic feature accuracy ratios of each of the n data sets and the original feature accuracy ratio of each of the n data sets correspondingly, to obtain n*k difference values.

As an example, in some embodiments of the present disclosure, the difference values may be determined by subtracting the original feature accuracy ratio $acc_0^i$ of each of the n data sets from the k synthetic feature accuracy ratios $acc_j^i$ of the corresponding data set respectively, and n*k difference values are obtained.

For example, n=2, k=3, that is, there are two data sets $[s^i, m^i]$, $i \in [1,2]$ for training, and each data set generates three synthetic features. The original feature accuracy ratios are $acc_0^1$ and $acc_0^2$ of the two data sets, the three synthetic feature accuracy ratios of the data set with a serial number of 1 are $acc_1^1$, $acc_2^1$ and $acc_3^1$, and the three synthetic feature accuracy ratios of the data set with a serial number of 2 is $acc_1^2$, $acc_2^2$ and $acc_3^2$. The difference values are determined by subtracting the original feature accuracy ratio $acc_0^i$; $i \in [1,2]$ of the corresponding data set from the three synthetic feature accuracy ratios $acc_j^i$, $i \in [1,2]$, $j \in [1,3]$ of the two data sets respectively, to obtain 2*3 difference values.

At block 208, the n*k meta features are classified based on the n*k difference values and a preset threshold, to obtain the classification label of each of the n*k meta features.

As an example, in some embodiments of the present disclosure, a preset threshold t=0.01 is set. If the difference value obtained in the block 207 is smaller than the preset threshold 0.01, that is, the synthetic feature accuracy ratio of an added synthetic feature is lower than the original feature accuracy ratio, it is considered that the synthetic feature is a synthetic feature classified in a poor category. And the classification label of the meta feature corresponding to the synthetic feature is determined as 0. If the difference value obtained in the block 207 is larger than or equal to the preset threshold 0.01, it is considering that the synthetic feature is a synthetic feature classified in a good category. And the classification label of the meta feature corresponding to the synthetic feature is determined as 1.

At block 209, a second classifier is trained based on the meta feature set and the classification label of each of the n*k meta features, model parameters and a numerical value of s are obtained, the numerical value of s is determined as the number S of pre-trained samples, and the meta feature evaluation model is generated according to the model parameters.

Optionally, in some embodiments of the present disclosure, the meta feature set and the classification label of each of the n*k meta features may be input into the second classifier $C_2$ for training, a target function recall is set as $$\text{recall}=C_2([s, n*k]).$$

When the recall reaches the maximum value, the model parameters and the numerical value s at the moment are selected, the numerical value of s is determined as the number S of the pre-trained samples, and the meta feature evaluation model is generated based on the model parameters.

Therefore, in a subsequent evaluation of the synthetic features, the meta feature evaluation model generated in the block 201 to 209 may perform a binary classification prediction on the meta features corresponding to the synthetic features, to obtain a probability of binary classification. The synthetic features classified in a good category are screened out according to the probability of the binary classification. The synthetic features classified in a good category are input into a subsequent classifier, and a synthetic feature evaluation efficiency and an accuracy ratio of the subsequent classifier are effectively improved.

Figure 3:
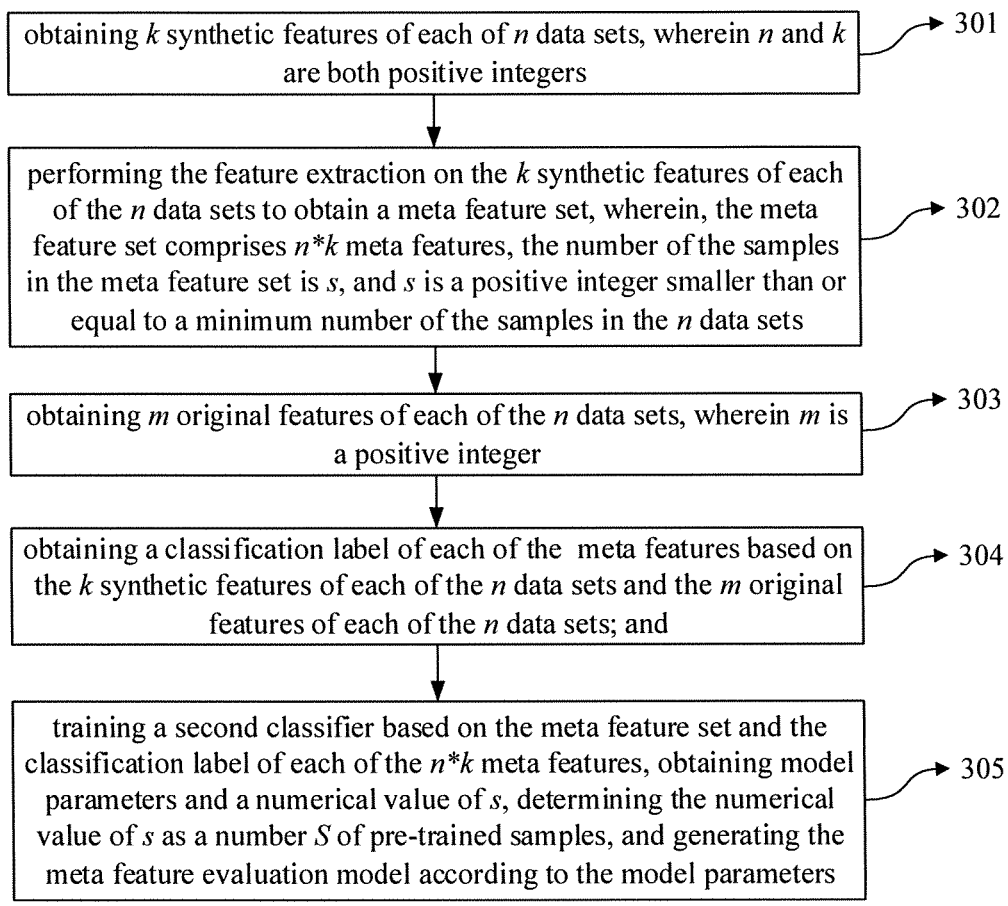
FIG. 3 is a schematic flowchart of a meta feature evaluation model training method provided by an embodiment of the present disclosure.

FIG. 3 is a schematic flowchart of a method for training a meta feature evaluation model provided in an embodiment of the present disclosure. It should be noted that, the method for training the meta feature evaluation model in the embodiment of the present disclosure may be applied to an apparatus for training the meta feature evaluation model, and the apparatus for training the meta feature evaluation model may be configured on an electronic device. As illustrated in FIG. 3, the method for training the meta feature evaluation model provided in an embodiment of the present disclosure may include following blocks.

At block 301, k synthetic features of each of n data sets are obtained. n and k are both positive integers.

As an example, n data sets $[s^i, m^i]$, $i \in [1, n]$ for training are provided, and each data set includes $m^i$ original features and $s^i$ samples. i is a serial number of the data set. That is, different data sets may contain different numbers of original features and different numbers of samples. Each data set generates k synthetic features $f_j^i, j \in [1, k], i \in [1, n]$ (for example, n=2, k=3, that is, there are two data sets $[s^i, m^i]$, $i \in [1,2]$ for training, each data set generates three synthetic features, the data set with a serial number of 1 will generate three synthetic features $f_2^1$, $f_2^1$ and $f_3^1$, and the data set with a serial number of 2 will generate three synthetic features $f_1^2$, $f_2^2$ and $f_3^2$), so that the n data sets generate n*k synthetic features. In some embodiments of the present disclosure, synthetic feature $f_j^i$, that is, $f_i^i = \text{Syn}(m^i)$, $j \in [1, k], i \in [1, n]$, may be generated by using an original feature $m^i$ according to a feature synthesis algorithm Syn. n and k are both positive integers.

At block 302, a feature extraction is performed on the k synthetic features of each of the n data sets to obtain a meta feature set. The meta feature set includes n*k meta features. A number of samples in the meta feature set is s, and s is a positive integer smaller than or equal to a minimum number of the samples in the n data sets;

Optionally, in some embodiments of the present disclosure, the feature extraction is performed on the synthetic features $f_j^i$ by adopting a minhash algorithm, to obtain meta features meta with S samples across different data sets. That is $$\text{meta}_j^i = \text{minhash}(f_j^i), j \in [1,k], i \in [1,n].$$

Therefore, the meta feature set [s, n*k] is obtained, the number of the samples of the meta features is s, and the number of the meta features is n*k. It should be noted that the number s of the samples is a positive integer smaller than or equal to the minimum number of the samples in then data sets, that is, $s \leq \min(s^i)$, $i \in [1, n]$. For example, let n=3, the number $s^1$ of the samples of the data set with a serial number of 1 is 10, the number $s^2$ of the samples of the data set with a serial number of 2 is 20, the number $s^3$ of the samples of the data set with a serial number of 3 is 30, and the minimum positive integer in the number of the samples in the three data sets is $s^1$. The feature extraction is performed on the synthetic features of the three data sets, and meta features meta with s samples are obtained. s is a positive integer less than or equal to 10.

At block 303, m original features of each of the n data sets are obtained. m is a positive.

That is, $m^i$ ($i \in [1, n]$) original features in each of the n data sets $[s^i, m^i]$, $i \in [1, n]$ are obtained. i is a serial number of the data set.

At block 304, a classification label of each of the n*k meta features is obtained based on the k synthetic features of each of the n data sets and the m original features of each of the n data sets.

As an example, in an embodiment of the present disclosure, the $m^i$ original features of each of the n data sets are input into a first classifier, to obtain an original feature accuracy ratio of each of the n data sets. The k synthetic features are added into the original features of corresponding data set respectively, to obtain fusion features of the n data sets respectively. The fusion features of the n data sets are input into the first classifier, to obtain k synthetic feature accuracy ratios of each of the n data sets. A difference calculation is performed on the k synthetic feature accuracy ratios of each of then data sets and the original feature accuracy ratio of the corresponding data set, to obtain n*k difference values. The n*k meta features are classified to obtain the classification label of each of the n*k meta features based on the n*k difference values and a preset threshold.

At block 305, a second classifier is trained based on the meta feature set and the classification label of each of the n*k meta features, model parameters and a numerical value of s are obtained, the numerical value of s is determined as the number S of pre-trained samples, and the meta feature evaluation model is generated according to the model parameters.

Optionally, in some embodiments of the present disclosure, the meta feature set and the classification label of each of the n*k meta features may be input into a second classifier $C_2$ for training, a target function recall is set as $$\text{recall}=C_2([s, n*k]).$$

When the recall reaches the maximum value, the model parameters and the numerical value s at the moment are selected, the numerical value of s is determined as the number S of pre-trained samples, and the meta feature evaluation model is generated based on the model parameters.

According to a method for training a meta feature evaluation model in an embodiment of the present disclosure, a feature extraction is performed on synthetic features, to obtain a meta feature set. A second classifier is trained according to the meta feature set and a classification label of each of the meta features, to obtain model parameters and a number S of samples. The meta feature evaluation model is generated according to the model parameters so that in the subsequent evaluation of the synthetic features, the meta feature evaluation model performs a feature extraction on the synthetic features to obtain corresponding meta features with S samples. A binary classification prediction is performed on the meta features to obtain a probability of binary classification. Synthetic features classified in a good category are screened out according to the probability of the binary classification. And the synthetic features classified in a good category are input into a subsequent classifier, so that a synthetic feature evaluation efficiency and an accuracy ratio of the subsequent classifier are effectively improved.

Figure 4:
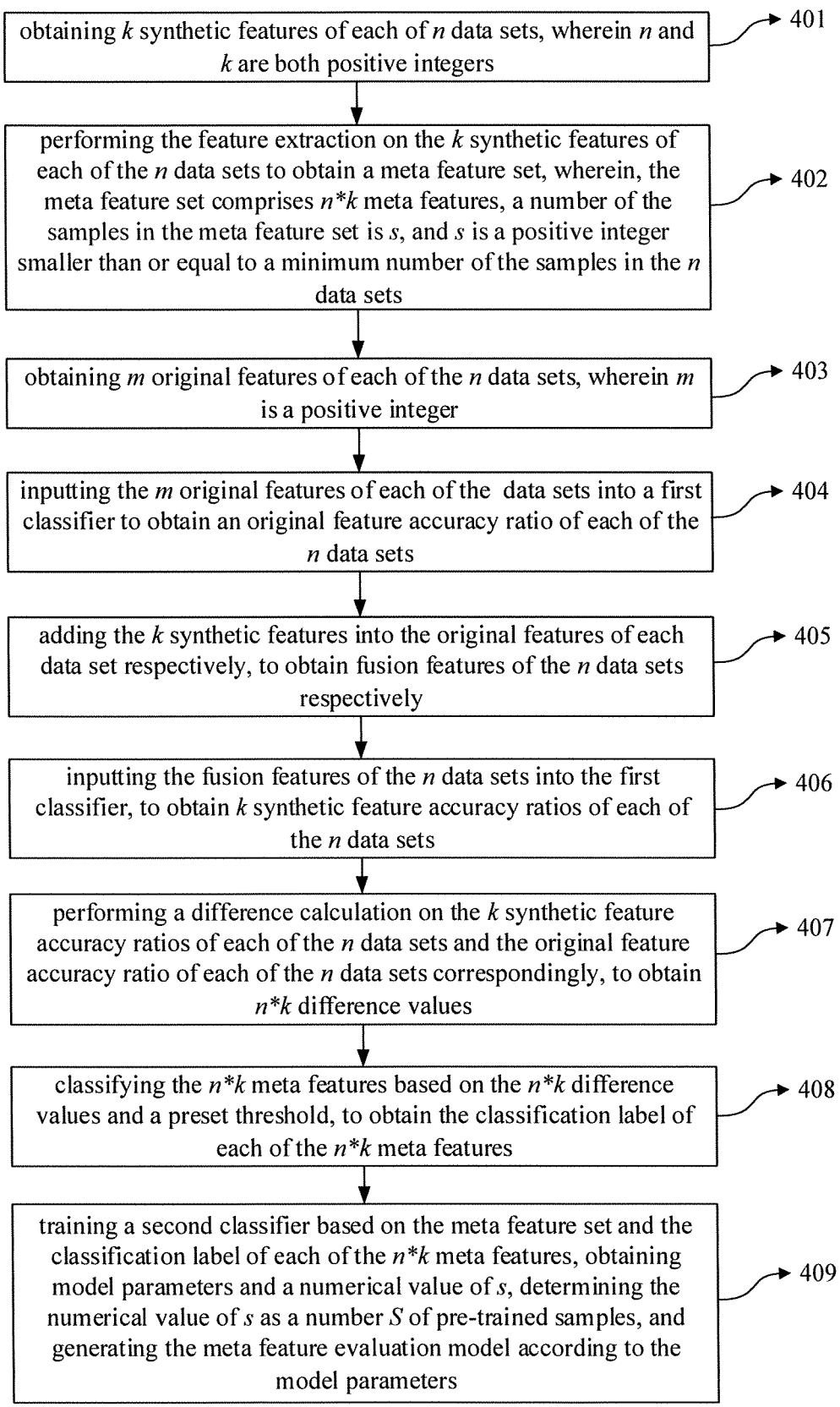
FIG. 4 is a schematic flowchart of a method for training a meta feature evaluation model provided in another embodiment of the present disclosure.

In some embodiments of the present disclosure, FIG. 4 is a schematic flowchart of a method for training a meta feature evaluation model provided in another embodiment of the present disclosure. As illustrated in FIG. 4, the method for training the meta feature evaluation model provided in the embodiment of the present disclosure may include following blocks.

At block 401, k synthetic features of each of n data sets are obtained. n and k are both positive integers.

At block 402, a feature extraction is performed on the k synthetic features of each of the n data sets to obtain a meta feature set. The meta feature set includes n*k meta features. A number of samples in the meta feature set is s, and s is a positive integer smaller than or equal to a minimum number of the samples in the n data sets.

At block 403, m original features of each of the n data sets are obtained. m is a positive integer.

At block 404, m original features of each of the n data sets are input into a first classifier, to obtain an original feature accuracy ratio of each of the n data sets.

As an example, in some embodiments of the present disclosure, $m^i$ ($i \in [1, n]$) original features of each of the n data sets are input into a first classifier $C_1$, to obtain original feature accuracy ratio $\text{acc}_0^i$ ($i \in [1, n]$) of each of the n data sets, that is $\text{acc}_0^i = C_1([s^i, m^i])$, $i \in [1, n]$.

At block 405, the k synthetic features are added into the original features of each data set respectively, to obtain fusion features of the n data sets respectively.

At block 406, the fusion features of the n data sets are input into the first classifier, to obtain k synthetic feature accuracy ratios of each of the n data sets.

As an example, in some embodiments of the present disclosure, the fusion features of the n data sets are input into the first classifier $C_1$, to obtain k synthetic feature accuracy ratios $\text{acc}_j^i$ ($i \in [1, n]$, $j \in [1, k]$) of each of the n data sets, that is $\text{acc}_j^i = C_1([s^i, m^i] \cup f_j^i)$, $j \in [1, k]$, $i \in [1, n]$.

At block 407, a difference calculation is performed on the k synthetic feature accuracy ratios of each of the n data sets and the original feature accuracy ratio of each of the n data sets correspondingly, to obtain n*k difference values.

As an example, in some embodiments of the present disclosure, the difference values may be determined by subtracting the original feature accuracy ratio $\text{acc}_0^i$ of each of the n data sets from the k synthetic feature accuracy ratios $\text{acc}_j^i$ of the corresponding data set respectively, and n*k difference values are obtained.

For example, n=2, k=3, that is, there are two data sets [$s^i$, $m^i$], $i \in [1,2]$ for training, and each data set generates three synthetic features. The original feature accuracy ratios are $\text{acc}_0^1$ and $\text{acc}_0^2$ of the two data sets, the three synthetic feature accuracy ratios of the data set with a serial number of 1 are $\text{acc}_1^1$, $\text{acc}_2^1$ and $\text{acc}_3^1$, and the three synthetic feature accuracy ratios of the data set with a serial number of 2 is $\text{acc}_1^2$, $\text{acc}_2^2$ and $\text{acc}_3^2$. The difference values are determined by subtracting the original feature accuracy ratios $\text{acc}_0^i$, $i \in [1,2]$ of the two data sets from the three synthetic feature accuracy ratios $\text{acc}_j^i$, $i \in [1,2]$, $j \in [1,3]$ of the corresponding data set respectively, to obtain 2*3 difference values.

At block 408, the n*k meta features are classified based on the n*k difference values and a preset threshold, to obtain the classification label of each of the n*k meta features.

As an example, in some embodiments of the present disclosure, a preset threshold t=0.01 is set. If the difference value obtained in block 407 is smaller than the preset threshold 0.01, that is, the synthetic feature accuracy ratio of an added synthetic feature is lower than the original feature accuracy ratio, it is considered that the synthetic feature is a synthetic feature classified in a poor category. The classification label of the meta feature corresponding to the synthetic feature is determined as 0. If the difference value obtained in the block 407 is larger than or equal to the preset threshold 0.01, it is considering that the synthetic feature is a synthetic feature classified in a good category. The classification label of the meta feature corresponding to the synthetic feature is determined as 1.

At block 409, a second classifier is trained based on the meta feature set and the classification label of each of the n*k meta features, model parameters and a numerical value of s are obtained, the numerical value of s is determined as a number S of pre-trained samples, and the meta feature evaluation model is generated according to the model parameters.

In the embodiment of the present disclosure, the block 401 to 403 and 409 may be implemented in any one method in each embodiment of the present disclosure, which is not specifically limited here and not repeated here.

According to a method for training a meta feature evaluation model in an embodiment of the present disclosure, a feature extraction is performed on synthetic features, to obtain a meta feature set. Original features are classified based on a corresponding original feature accuracy ratio and synthetic feature accuracy ratios of each of the data sets, to obtain a classification label of each of meta features. A second classifier is trained according to the meta feature set and a classification label of each of the meta features, to obtain model parameters and a number S of samples. The meta feature evaluation model is generated according to the model parameters, so that in the subsequent evaluation of the synthetic features, the meta feature evaluation model performs a binary classification prediction on the meta features to obtain a probability of binary classification. Synthetic features classified in a good category are screened out according to the probability of the binary classification. The synthetic features classified in a good category are input into a subsequent classifier, so that a synthetic feature evaluation efficiency and an accuracy ratio of the subsequent classifier are effectively improved.

Figure 5:
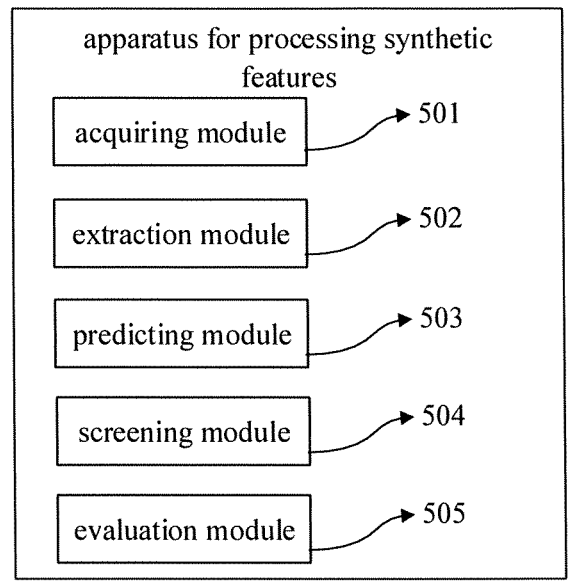
FIG. 5 is a block diagram of an apparatus for processing synthetic features provided in an embodiment of the present disclosure.

FIG. 5 is a block diagram of an apparatus for processing synthetic features provided in an embodiment of the present disclosure. As shown in FIG. 5, the apparatus for processing synthetic features includes an acquiring module 501, an extraction module 502, a predicting module 503, a screening module 504 and an evaluation module 505.

Specifically, the acquiring module 501 is configured to obtain synthetic features to be evaluated and original features corresponding to the synthetic features.

The extraction module 502 is configured to perform a feature extraction on the synthetic features to be evaluated based on a number S of pre-trained samples, to obtain meta features with S samples. S is a positive integer.

In some embodiments, the extraction module 502 is specifically configured to perform a feature extraction on the synthetic features to be evaluated by adopting a minhash algorithm based on the number S of the pre-trained samples, to obtain the meta features with S samples.

The predicting module 503 is configured to input the meta features into a pre-trained meta feature evaluation model for a binary classification prediction, to obtain a probability of binary classification.

The screening module 504 is configured to perform quality screening on the synthetic features to be evaluated according to the probability of the binary classification, to obtain second synthetic features to be evaluated. The second synthetic features are classified in a good category.

The evaluation module 505 is configured to input the second synthetic features and the original features into a first classifier for evaluation. The evaluation includes training, verifying and testing evaluation.

Figure 6:
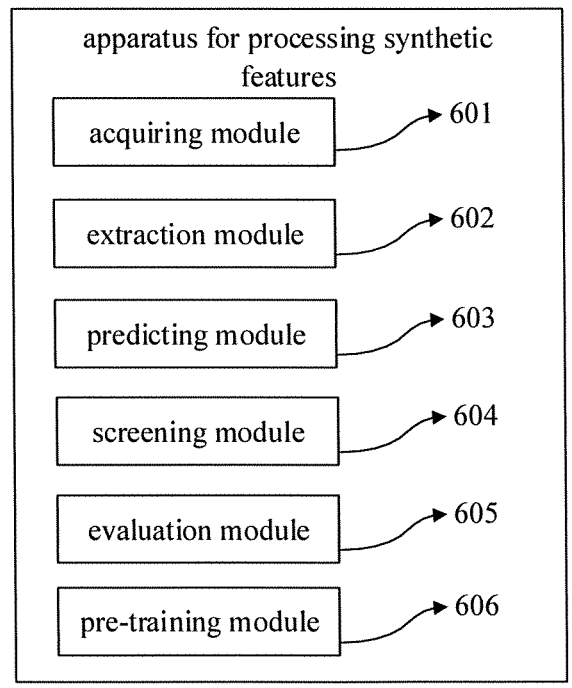
FIG. 6 is a block diagram of an apparatus for processing synthetic features provided in another embodiment of the present disclosure.

Optionally, in some embodiments of the present disclosure, FIG. 6 is a block diagram of an apparatus for processing synthetic features provided in another embodiment of the present disclosure. As illustrated in FIG. 6, the apparatus for processing synthetic features may further include a pre-training module 606 configured to pre-train a meta feature evaluation model and a number S of samples. The pre-training module 606 is specifically configured to: obtain k synthetic features of each of n data sets, in which, n and k are both positive integers; perform a feature extraction on the k synthetic features of each of the n data sets, to obtain a meta feature set, in which, the meta feature set includes n*k meta features, a number of samples in the meta feature set is s, and s is a positive integer smaller than or equal to a minimum number of samples in the n data sets; obtain m original features of each of the n data sets, in which, m is a positive integer; obtain a classification label of each of the n*k meta features based on the k synthetic features of each of the n data sets and the m original features of each of the n data sets; and train a second classifier based on the meta feature set and the classification label of each of the n*k meta features, obtain model parameters and a numerical value of s, determine the numerical value of s as a number S of pre-trained samples, and generate the meta feature evaluation model according to the model parameters.

In some embodiments of the present disclosure, the pre-training module 606 is further configured to: input the m original features of each of the n data sets into a first classifier to obtain an original feature accuracy ratio of each of the n data sets; add the k synthetic features into the original features in each data set respectively, to obtain fusion features of the n data sets respectively; input the fusion features of the n data sets into the first classifier, to obtain k synthetic feature accuracy ratios of each of the n data sets; and obtain the classification label of each of the n*k meta features based on the original feature accuracy ratio of each of the n data sets and the k synthetic feature accuracy ratios of each of the n data sets.

In some embodiments of the present disclosure, the pre-training module 606 is further configured to: perform a difference calculation on the k synthetic feature accuracy ratios of each of the n data sets and the original feature accuracy ratio of corresponding data set respectively, to obtain n*k difference values.

Modules 601 to 605 in FIG. 6 have the same function and structure with modules 501 to 505 in FIG. 5.

With regard to the device in the above embodiments, the specific way in which each module performs the operation has been described in detail in the embodiments of the method and will not be elaborated here.

According to the apparatus for processing synthetic features in an embodiment of the present disclosure, the feature extraction is performed on the synthetic features to be evaluated based on the number S of the pre-trained samples, to obtain the meta features with S samples. The meta features are input into the pre-trained meta feature evaluation model for a binary classification prediction, to obtain a probability of binary classification. The synthetic features to be evaluated are screened according to the probability of the binary classification, to obtain second synthetic features classified in a good category. The second synthetic features classified in a good category and the original features are input into a first classifier for evaluation, so that the first classifier may quickly evaluate the synthetic features, the time for evaluating the synthetic features classified in a poor category is reduced, and an accuracy ratio of the first classifier may be improved.

Figure 7:
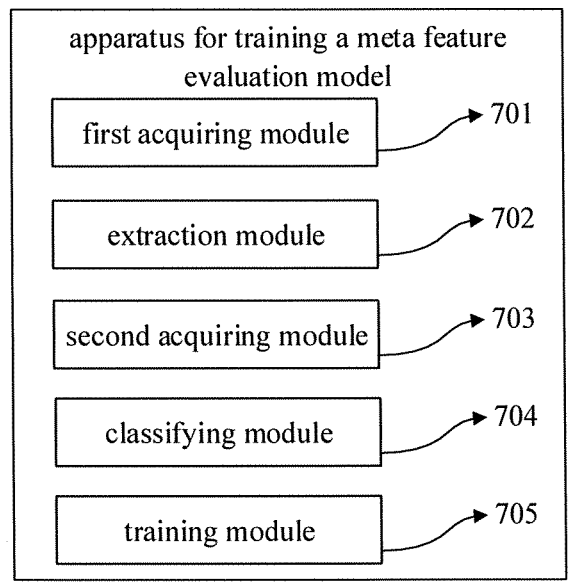
FIG. 7 is a block diagram of an apparatus for training a meta feature evaluation model provided in an embodiment of the present disclosure.

FIG. 7 is a block diagram of an apparatus for training a meta feature evaluation model provided in an embodiment of the present disclosure. As illustrated in FIG. 7, the apparatus for training the meta feature evaluation model may further include: a first acquiring module 702, an extraction module 702, a second acquiring module 703, a classifying module 704 and a training module 705.

Specifically, the first acquiring module 701 is configured to obtain k synthetic features of each of the n data sets. n and k are both positive integers.

The extraction module 702 is configured to perform a feature extraction on the k synthetic features of each of the n data sets to obtain a meta feature set. The meta feature set includes n*k meta features. The number of samples in the meta feature set is s, and s is a positive integer smaller than or equal to a minimum number of the samples in the n data sets.

The second acquiring module 703 is configured to obtain m original features of each of the n data sets. in is a positive integer.

The classifying module 704 is configured to obtain a classification label of each of the n*k meta features based on the k synthetic features of each of the n data sets and the m original features of each of then data sets.

The training module 705 is configured to train a second classifier based on the meta feature set and the classification label of each of the n*k meta features, obtain model parameters and a numerical value of s, determine the numerical value of as the number S of pre-trained samples, and generate the meta feature evaluation model according to the model parameters.

In some embodiments of the present disclosure, the classifying module 704 is further configured to: input the m original features of each of the n data sets into a first classifier to obtain an original feature accuracy ratio of each of the n data sets; add the k synthetic features into the original features in each data set respectively, to obtain fusion features of the n data sets respectively; input the fusion features of the n data sets into the first classifier, to obtain k synthetic feature accuracy ratios of each of then data sets; and obtain the classification label of each of the n*k meta features based on the original feature accuracy ratio of each of the n data sets and the k synthetic feature accuracy ratios of each of the n data sets.

In some embodiments of the present disclosure, the training module 704 is further configured to: perform a difference calculation on the k synthetic feature accuracy ratios of each of the n data sets and the original feature accuracy ratio of corresponding data set respectively, to obtain n*k difference values; classify the n*k meta features based on the n*k difference values and a preset threshold, to obtain the classification label of each of the n*k meta features.

With regard to the device in the above embodiments, the specific way in which each module performs the operation has been described in detail in the embodiments of the method and will not be elaborated here.

According to an apparatus for training a meta feature evaluation model in an embodiment of the present disclosure, a feature extraction is performed on synthetic features, to obtain a meta feature set. Original features are classified based on a corresponding original feature accuracy ratio and synthetic feature accuracy ratios of each of the data sets, to obtain a classification label of each of meta features. A second classifier is trained according to the meta feature set and the classification label of each of the meta features, to obtain model parameters and a number S of samples. The meta feature evaluation model is generated according to the model parameters, so that in the subsequent evaluation of the synthetic features, the meta feature evaluation model performs a binary classification prediction on the meta features to obtain a probability of binary classification. Synthetic features classified in a good category are screened out according to the probability of the binary classification. The synthetic features classified in a good category are input into a subsequent classifier, so that a synthetic feature evaluation efficiency and an accuracy ratio of the subsequent classifier are effectively improved.

In the embodiment of the present disclosure, an electronic device, a readable storage medium and a computer program product are further provided according to embodiments of the present disclosure.

Figure 8:
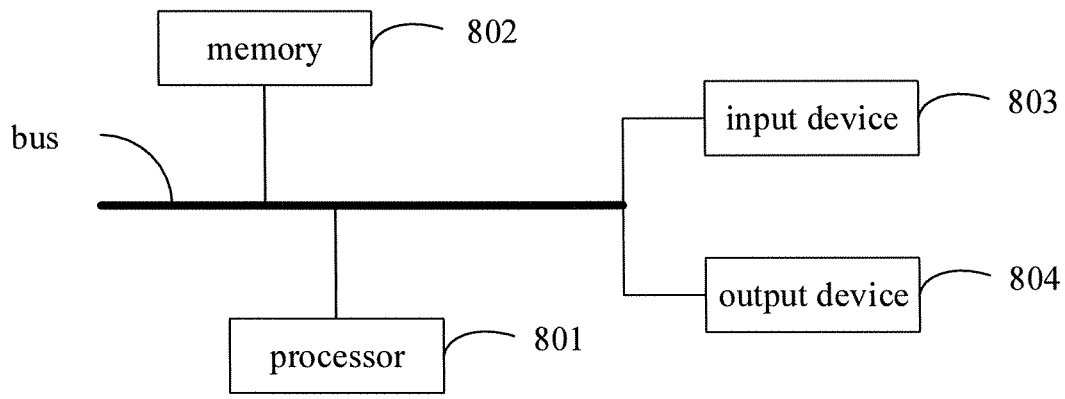
FIG. 8 is a block diagram of an electronic device for implementing a method for processing synthetic features or a method for training a meta feature evaluation model in the embodiment of the present disclosure.

As illustrated in FIG. 8, FIG. 8 is a block diagram of an electronic device for implementing a method for processing synthetic features or a method for training a meta feature evaluation model in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 8, the electronic device includes one or more processors 801, a memory 802, and interfaces configured to connect various components including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementations, a plurality of processors and/or a plurality of buses may be configured with a plurality of memories if necessary. Similarly, the processor may connect a plurality of electronic devices, and each device provides a part of necessary operations (for example, as a server array, a group of blade servers, or a multi-processor system). FIG. 8 takes one processor 801 as an example.

A memory 802 is a non-transitory computer-readable storage medium provided in the present disclosure. The memory stores instructions executable by the at least one processor, so that the at least one processor executes a method for processing synthetic features or a method for training a meta feature evaluation model as described in the present disclosure. The non-transitory computer-readable storage medium of the present disclosure stores computer instructions, in which the computer instructions are configured so that a method for processing synthetic features or a method for training a meta feature evaluation model provided in the present disclosure.

As a non-transitory computer-readable storage medium, the memory 802 may be configured to store non-transitory software programs, non-transitory computer-executable programs and modules, such as program instructions/modules corresponding to a method for processing synthetic features or a method for training a meta feature evaluation model in the embodiments of the present disclosure (for example, as illustrated in FIG. 6, the acquiring module 601, the extraction module 602, the predicting module 603, the screening module 604, the evaluation module 605 and the pre-training module 606, and as illustrated in FIG. 7, the first acquiring module 702, the second acquiring module 703, the classifying module 704 and the training module 705). The processor 801 executes various functional applications and data processing of the server by running a non-transitory software program, an instruction, and a module stored in the memory 802, that is, a method for processing synthetic features or a method for training a meta feature evaluation model in the above method embodiment is implemented.

The memory 802 may include a program storage area and a data storage area; the program storage area may store operation systems and application programs required by at least one function; the data storage area may store data created based on the use of an electronic device according to the method or training a meta feature evaluation model method for dialogue processing, etc. In addition, the memory 802 may include a high-speed random access memory, and may also include a non-transitory memory, such as at least one magnetic disk storage device, a flash memory device, or other non-transitory solid-state storage devices. In some embodiments, the memory 802 optionally includes a memory set remotely relative to the processor 801 that may be connected to an electronic device executing a method for processing synthetic features or a method for training a meta feature evaluation model via a network. The example of the above networks includes but not limited to an Internet, an enterprise intranet, a local area network, a mobile communication network and their combination.

An electronic device in a method for processing synthetic features or a method for training a meta feature evaluation model may further include an input apparatus 803 and an output apparatus 804. The processor 801, the memory 802, the input apparatus 803, and the output apparatus 804 may be connected through a bus or in other ways. In FIG. 8, a connection via a bus is taken as an example.

The input apparatus 803 may receive input digital or character information, and generate key signal input related to user setting and function control of an electronic device executing a method for processing synthetic features or a method for training a meta feature evaluation model such as a touch screen, a keypad, a mouse, a track pad, a touch pad, an indicating rod, one or more mouse buttons, a trackball, a joystick and other input apparatuses. The output apparatus 804 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, that is, a computer program is further provides in the present disclosure, when the computer program is executed by the processor, a method processing synthetic features or a method for training a meta feature evaluation model described in the embodiments is realized, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain. It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for processing synthetic features, comprising:
obtaining the synthetic features to be evaluated and original features corresponding to the synthetic features;
performing a feature extraction on the synthetic features to be evaluated based on a number S of pre-trained samples, to obtain meta features with S samples, wherein S is a positive integer;
inputting the meta features into a pre-trained meta feature evaluation model for a binary classification prediction, to obtain a probability of binary classification;
performing quality screening on the synthetic features to be evaluated according to the probability of the binary classification, to obtain a second synthetic features to be evaluated, wherein the second synthetic features are classified in a good category; and
inputting the second synthetic features and the original features into a first classifier for evaluation.

2. The method of claim 1, wherein performing a feature extraction on the synthetic features to be evaluated based on a number S of pre-trained samples, to obtain meta features with S samples comprises:
performing the feature extraction on the synthetic features to be evaluated by adopting a minhash algorithm based on the number S of the pre-trained samples, to obtain the meta features with S samples.

3. The method of claim 1, wherein the meta feature evaluation model and the number S of the samples are obtained by pre-training in following steps:
obtaining k synthetic features of each of then data sets, wherein n and k are both positive integers;
performing the feature extraction on the k synthetic features of each of the n data sets to obtain a meta feature set, wherein, the meta feature set comprises n*k meta features, the number of the samples in the meta feature set is s, and s is a positive integer smaller than or equal to a minimum number of the samples in the n data sets;
obtaining m original features of each of the n data sets, wherein m is a positive integer;
obtaining a classification label of each of the n*k meta features based on the k synthetic features of each of the n data sets and the m original features of each of the n data sets; and
training a second classifier based on the meta feature set and the classification label of each of the n*k meta features, obtaining model parameters and a numerical value of s, determining the numerical value of s as the number S of the pre-trained samples, and generating the meta feature evaluation model according to the model parameters.

4. The method of claim 3, wherein obtaining a classification label of each of the n*k meta features based on the k synthetic features of each of the n data sets and the m original features of each of the n data sets comprises:
inputting m original features of each of the n data sets into the first classifier to obtain an original feature accuracy ratio of each of the n data sets;
adding the k synthetic features into the original features of each data set respectively, to obtain fusion features of the n data sets respectively;
inputting the fusion features of the n data sets into the first classifier, to obtain k synthetic feature accuracy ratios of each of the n data sets; and
obtaining the classification label of each of the n*k meta features based on the original feature accuracy ratio of each of the n data sets and the k synthetic feature accuracy ratios of each of the n data sets.

5. The method of claim 4, wherein obtaining the classification label of each of the n*k meta features based on the original feature accuracy ratio of each of the n data sets and the k synthetic feature accuracy ratios of each of the n data sets comprises:
performing a difference calculation on the k synthetic feature accuracy ratios of each of the n data sets and the original feature accuracy ratio of each of the n data sets correspondingly, to obtain n*k difference values; and
classifying the n*k meta features based on the n*k difference values and a preset threshold, to obtain the classification label of each of the n*k meta features.

6. A method for training a meta feature evaluation model, applied to implement a synthetic feature evaluation, comprising:
obtaining k synthetic features of each of n data sets, wherein n and k are both positive integers;
performing a feature extraction on the k synthetic features of each of the n data sets, to obtain a meta feature set, wherein, the meta feature set comprises n*k meta features, a number of samples in the meta feature set is s, and s is a positive integer smaller than or equal to a minimum number of samples in the n data sets;
obtaining m original features of each of the n data sets, wherein m is a positive integer;
obtaining a classification label of each of the n*k meta features based on the k synthetic features of each of the n data sets and the m original features of each of the n data sets; and
training a second classifier based on the meta feature set and the classification label of each of the n*k meta features, obtaining model parameters and a numerical value of s, determining the numerical value of s as a number S of pre-trained samples, and generating the meta feature evaluation model according to the model parameters.

7. The method of claim 6, wherein obtaining a classification label of each of the n*k meta features based on the k synthetic features of each of the n data sets and the m original features of each of the n data sets comprises:
inputting the m original features of each of the n data sets into a first classifier to obtain an original feature accuracy ratio of each of the n data sets;
adding the k synthetic features into the original features in each data set respectively, to obtain fusion features of the n data sets;
inputting the fusion features of the n data sets into the first classifier, to obtain k synthetic feature accuracy ratios of each of the n data sets; and
obtaining the classification label of each of the n*k meta features based on the original feature accuracy ratio of each of the n data sets and the k synthetic feature accuracy ratios of each of the n data sets.

8. The method of claim 7, wherein obtaining the classification label of each of the n*k meta features based on the original feature accuracy ratio of each of the n data sets and the k synthetic feature accuracy ratios of each of the n data sets comprises:
performing a difference calculation on the k synthetic feature accuracy ratios of each of the n data sets and the original feature accuracy ratio of each of the n data sets correspondingly, to obtain n*k difference values; and classifying the n*k meta features based on the n*k difference values and a preset threshold, to obtain the classification label of each of the n*k meta features.

9. A apparatus for processing synthetic features, comprising:
one or more processors;
a memory storing instructions executable by the one or more processors;
wherein the one or more processors are configured to:
obtain the synthetic features to be evaluated and original features corresponding to the synthetic features;
perform a feature extraction on the synthetic features to be evaluated based on a number S of pre-trained samples, to obtain meta features with S samples, wherein S is a positive integer;
input the meta features into a pre-trained meta feature evaluation model for a binary classification prediction, to obtain a probability of binary classification;
perform quality screening on the synthetic features to be evaluated according to the probability of the binary classification, to obtain second synthetic features to be evaluated, wherein the second synthetic features are classified in a good category; and
input the second synthetic features and the original features into a first classifier for evaluation.

10. The apparatus of claim 9, wherein the one or more processors are configured to:
perform the feature extraction on the synthetic features to be evaluated by adopting a minhash algorithm based on the number S of the pre-trained samples, to obtain the meta features with S samples.

11. The apparatus of claim 9, wherein the one or more processors are configured to:
pre-train the meta feature evaluation model and the number S of samples, and is specifically configured to:
obtain k synthetic features of each of the n data sets, wherein n and k are both positive integers;
perform the feature extraction on the k synthetic features of each of the n data sets to obtain a meta feature set, wherein, the meta feature set comprises n*k meta features, the number of the samples in the meta feature set is s, and s is a positive integer smaller than or equal to a minimum number of the samples in the n data sets;
obtain m original features of each of the n data sets, wherein m is a positive integer;
obtain a classification label of each of the n*k meta features based on the k synthetic features of each of the n data sets and the m original features of each of the n data sets; and
train a second classifier based on the meta feature set and the classification label of each of the n*k meta features, obtain model parameters and a numerical value of s, determine the numerical value of s as the number S of the pre-trained samples, and generate the meta feature evaluation model according to the model parameters.

12. The apparatus of claim 11, wherein the one or more processors are specifically configured to:
input m original features of each of the n data sets into the first classifier to obtain an original feature accuracy ratio of each of the n data sets;
add the k synthetic features into the original features of each data set respectively, to obtain fusion features of the n data sets respectively;
input the fusion features of the n data sets into the first classifier, to obtain k synthetic feature accuracy ratios of each of the n data sets; and
obtain the classification label of each of the n*k meta features based on the original feature accuracy ratio of each of the n data sets and the k synthetic feature accuracy ratios of each of the n data sets.

13. The apparatus of claim 12, wherein the one or more processors are specifically configured to:
perform a difference calculation on the k synthetic feature accuracy ratios of each of the n data sets and the original feature accuracy ratio of each of the n data sets correspondingly, to obtain n*k difference values; and
classify the n*k meta features based on the n*k difference values and a preset threshold, to obtain the classification label of each of the n*k meta-features.

* * * * *